United States Patent
Fowler et al.

[15] 3,696,831
[45] Oct. 10, 1972

[54] VALVE

[72] Inventors: John H. Fowler, Glenshaw, Pa.;
Robert D. Barnett, Houston, Tex.

[22] Filed: Nov. 11, 1971

[21] Appl. No.: 198,001

Related U.S. Application Data

[63] Continuation of Ser. No. 21,101, March 19, 1970, abandoned.

[52] U.S. Cl. ..............137/246.12, 251/84, 251/175, 251/327
[51] Int. Cl. ..................................................F16k 3/26
[58] Field of Search............137/246, 246.11, 246.12; 251/84, 175, 326, 327

[56] References Cited

UNITED STATES PATENTS 3,314,441   4/1967   Volpin..................137/246.12

*Primary Examiner*—Henry T. Klinksiek
*Attorney*—Murray Robinson and Ned L. Conley

[57] ABSTRACT

A gate valve comprising a valve body having inlet and outlet conduits with a chamber therebetween and a plane surfaced seat member in the inlet conduit. A plane surfaced gate having an opening therethrough is disposed in the chamber with reciprocating apparatus for moving the gate from a closed position in which flow is blocked through said conduits and an open position in which flow is allowed through said conduits and said gate opening. A resilient member may be installed adjacent the seat member urging the seat member and gate toward and in sealing contact with each other when the gate is in closed position so that the chamber is isolated from the inlet conduit. A plane surfaced skirt member may be mounted in the chamber adjacent to the gate member and with an opening therethrough aligned with the outlet conduit. The skirt member provides a sliding surface for one side of the gate member. There may be no pressure seal isolating the chamber and outlet conduit in the closed position.

20 Claims, 4 Drawing Figures

Robert D. Barnett
John H. Fowler
INVENTORS

BY Bill B. Berryhill
ATTORNEY

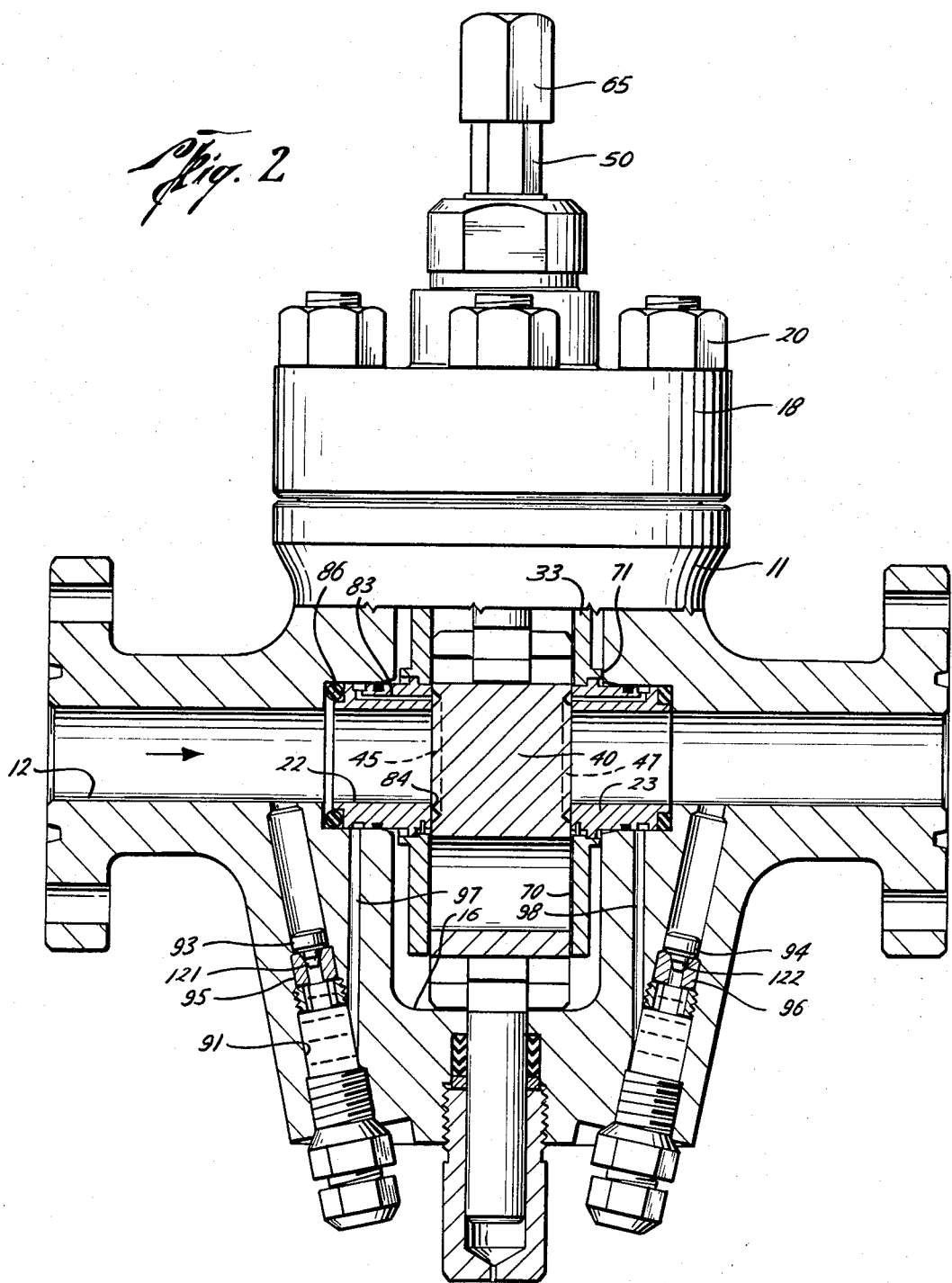

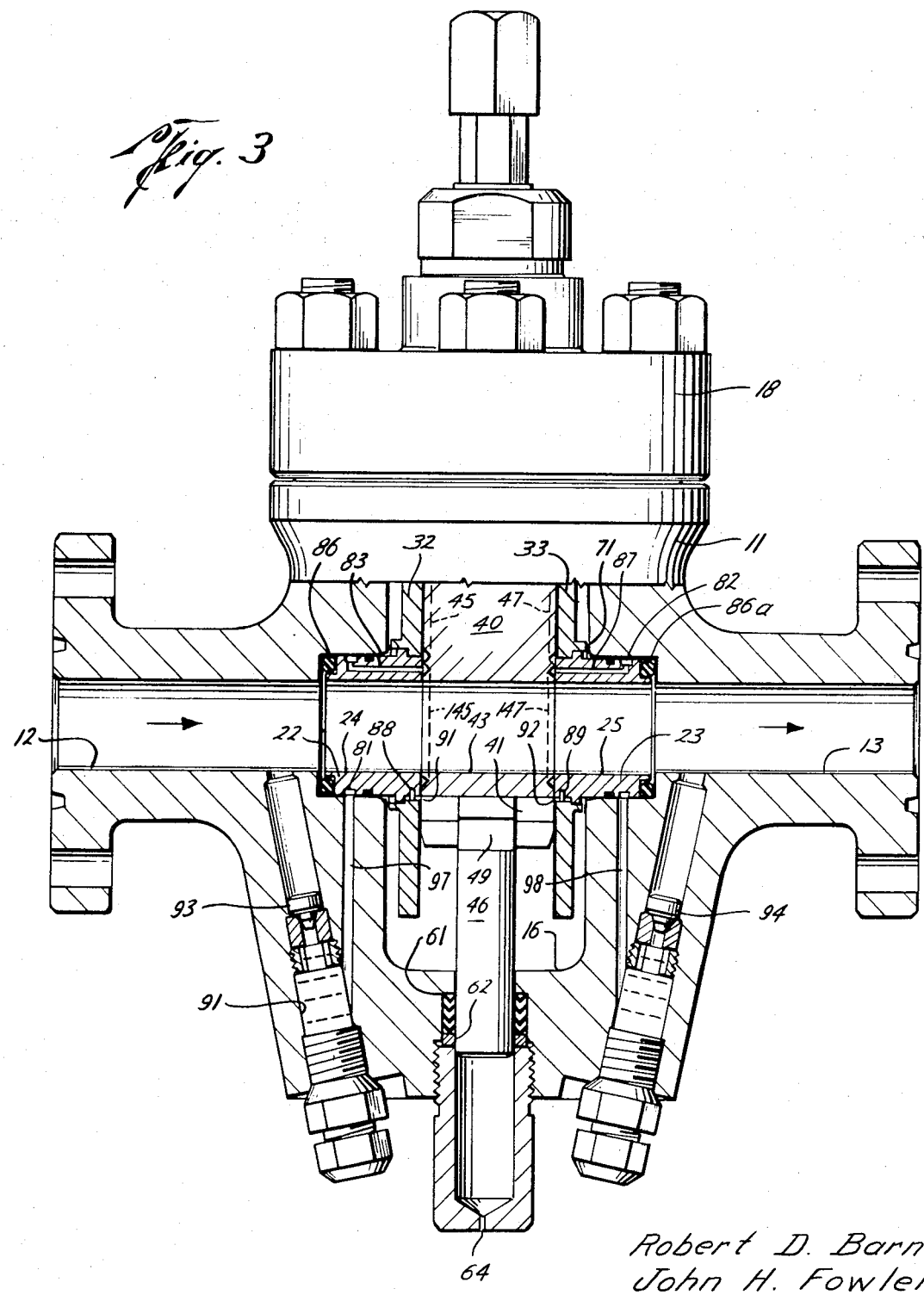

VALVE

This is a continuation of application Ser. No. 21,101, filed Mar. 19, 1970, now abandoned.

BACKGROUND OF THE INVENTION

1. Field of the Invention

This invention pertains to valves and especially gate valves suitable for high pressure service. The invention is particularly directed to improvements in the gate and seat arrangement and automatic plastic sealant system for a through-conduit type high pressure valve.

2. Description of the Prior Art

Gate valves, of course, have been commonly used for many years. Automatic lubricated or plastic sealed valves have also been in use for some time. One such valve is shown in U.S. Pat. No. 2,980,129 issued Apr. 18, 1961.

Gate valves are employed in a variety of services. In the petroleum industry, they are used in high pressure oil and/or gas service. One of the problems of using a gate valve in high pressure service of several thousand pounds per square inch is the initial torque required to open such a valve. The high differential across the gate creates a large lateral force which, when combined with the frictional drag between the gate and seat, requires a very large opening torque.

In addition, most plastic sealing valves rely on line pressure to drive a piston in a cylinder filled with a sealant material. The sealant is squeezed through a passage into a groove at the interface between the valve seat and gate. When the sealant material is depleted it must be replenished. However, to the applicants' knowledge, present piston and cylinder designs will not prevent high pressure blowby when the sealant is depleted. This results in the loss of a seal and erosion damage to the valve seat and gate.

SUMMARY OF THE INVENTION

The present invention discloses a unique seat and gate arrangement and a unique shut-off feature in the sealant system of an automatic plastic sealing high pressure gate valve. The seats are axially slidable in the inlet and outlet conduits. Associated with the seats is a skirt member mounted around one end of each seat member. The skirt member is axially movable in relation to the conduits also and is coated with a low-friction material against which the gate member bears. The seat member on the inlet or upstream side of the valve is subjected at one end to upstream pressure, the opposite end being the face for sealing contact with the gate. The downstream seat does not seal against the gate and is free to move away from the gate so the lateral force against the gate is solely supported by the low-friction surface of the downstream skirt member. The gate member is provided with annular sealant grooves which are covered by the skirts when the valve is opened to prevent loss of sealant material. Since there is no downstream seal and the skirts are provided with low-friction material the opening torque is greatly reduced.

The sealant system comprises a reservoir connected by ports to the gate sealant groove. The reservoir is provided with a piston subjected on one side to upstream pressure for squeezing sealant material into the gate groove. This piston is provided with a frusto-conical tip which is engageable with a frusto-conical port entrance to shut off flow to the sealant groove when the reservoir is depleted. This prevents high pressure blowby and erosion.

BRIEF DESCRIPTION OF THE DRAWINGS

For a detailed description of a preferred embodiment of the invention reference will be made to the accompanying drawings, but this is only exemplary of the invention which can be varied by one skilled in the art. In the drawings:

FIG. 2 is an elevation view in partial section of the valve of FIG. 1, shown in closed position; and FIG. 3 is an elevation view in partial section of an alternate embodiment of the invention, showing the valve in open position.

DESCRIPTION OF A PREFERRED EMBODIMENT

Figures 1, 1A:
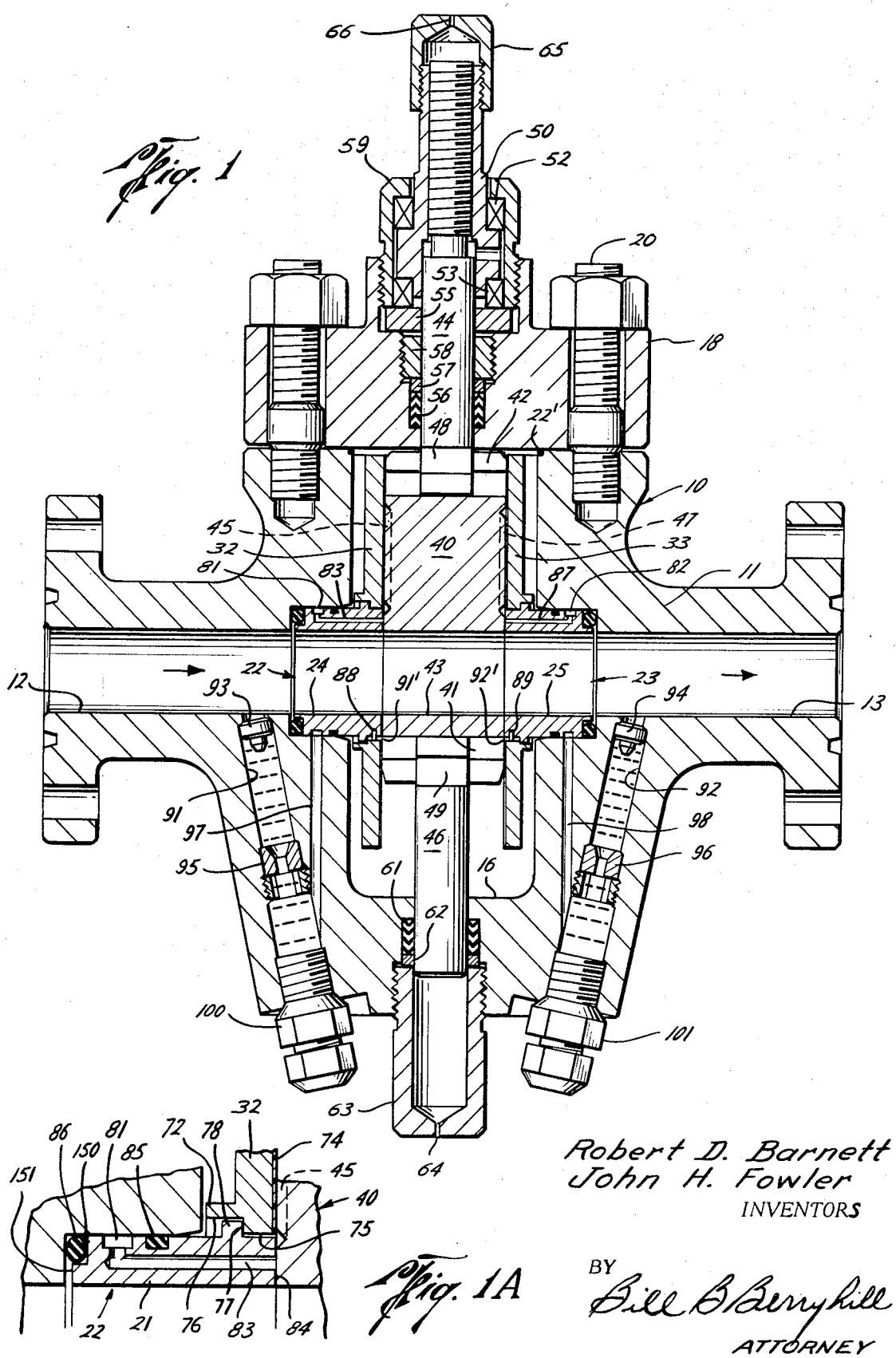
FIG. 1 is an elevation view in section of a valve according to a preferred embodiment of the invention, showing the valve in open position.
FIG. 1A is a detailed section of a portion of the valve of FIG. 1 showing the construction of the seat member and skirt according to a preferred embodiment.

Referring first to FIG. 1, a gate valve 10 is shown in the opened position. Valve 10 includes a body 11 having aligned cylindrical inlet and outlet conduits 12, 13, respectively, at opposite sides of valve chamber 16. Chamber 16 is closed at its upper end by bonnet 18 which may be attached to body 11 by plurality of bolts 20. A ring gasket 22' prevents pressure loss from the chamber 16.

Mounted in a counterbore of each conduit 12, 13 is a seat member 22, 23 which has cylindrical ports 24, 25 aligned with conduits 12, 13. Each seat member 22, 23 has a corresponding skirt member 32, 33 mounted in a manner to be described more fully hereafter. A plane surfaced gate member 40 is carried between seats 22, 23 on an operating stem 44. In this particular embodiment a balancing stem 46 is also attached to gate 40, although the invention could be utilized on a single stem valve. Although stem 44 is a rising stem, the invention could also be used on a non-rising stem valve. Stems 44 and 46 may be attached to the gate 40 in any suitable manner. For illustration purposes they are shown to be slotted at 48, 49 for mating with tee slots 41, 42 at the ends of gate 40. Gate 40, of course, has a cylindrical opening 43, which in the opened position shown is aligned with conduits 12, 13 and seat ports 24, 25. Annular sealing grooves 45, 47 are cut in the opposite faces of gate 40 above opening 43.

As mentioned before, stem 44 is a rising stem and, as is known in the art, is provided with a stem nut 50, thrust bearings 52, 53 thrust plate 55, packing 56, packing gland 57, packing nut 58 and bearing housing 59. As usual stem 44 is threaded at its upper end for threaded engagement with operating nut 50. By turning nut 50 with an operating handle or valve operator (not shown) the stem 44 rises or falls, depending on the direction turned, to open or close the valve by reciprocating gate 40 between seat skirts 32, 33. The balanced stem 46 is also provided with packing 61 and a packing gland 62 which are held in place by cylindrical stem housing 63. Housing 63 is provided with a vent 64 so that only atmospheric pressure bears against the end of stem 46. Cap 65 at the upper end of nut 50 is also vented at 66 so that the ends of both stems are subjected to balanced forces.

Referring also now to FIG. 1A, the particular seat arrangement will be described in more detail with reference to the left hand or upstream side of the valve in this case. Skirt 32 is mounted around one end of seat member 22 for cooperative movement therewith. Skirt 32 has a hub portion 72 opposite its face. The face of skirt 32 is coated with a low friction material 74 such as Teflon or the like. Skirt 32 has a cylindrical main bore 75 and counterbore 76 joined by annular surface 77. Seat 22 comprises a generally cylindrical body 21 with an annular flange or shoulder 78 thereabout. The outside diameter of seat member body portion 21 and shoulder 78 are such that they fit skirt bore 75 and counterbore 76, respectively, in a sliding telescopic fit.

Seat member body 21 has an annular sealant groove 81 around its exterior and a jumper port 83 connecting groove 81 to the inner face 84 of seat member 22. Annular seals 85 and 86 isolate groove 81 from upstream pressure and pressure in valve chamber 16. In addition to serving a sealing function, resilient seal 86 also biases seat member 22 toward gate 40. At the outer end of seat body 21 annular surfaces 150 and 151 present a total area, subjected to the pressure in conduit 12, substantially equal to the area of face 84. Shoulder 78 contacts skirt shoulder 77 causing skirt face 74 to abut gate 40 covering sealing groove 45 to prevent loss of sealant material therein. In the open position of FIG. 1 the seat member 23 and skirt 33 are forced toward gate 40 in the same manner to cover sealing groove 47. Radial pins 88, 89 may be affixed to seat members 22, 23, respectively, for sliding engagement with longitudinal slots 91', 92' to prevent rotation but to allow relative axial movement of seat members 22, 23, and skirts 32, 33.

Valve 10 is provided with a plastic sealant system comprising cylindrical reservoirs 91, 92 for sealant material, pistons 93, 94, port bushings 95, 96, ports 97, 98 and fittings 100, 101. Port bushings 95, 96 are inserted through the lower end of reservoirs 91 and 92 with fittings 100 and 101 removed. They may be screwed into place. Fittings 100 and 101 may be used to replenish reservoirs 91, 92. The pressure in conduits 12, 13 exerts a force on the upper side of pistons 93, 94 to force sealing material out of reservoirs 91, 92 through ports 97, 98 and into the annular sealing grooves 81, 82 around seat members 22, 23 and jumper ports 83, 87. In the opened valve position of FIG. 1, jumper ports 83, 87 open against the abutting flat faces of gate 40, stopping the flow of sealant material.

As gate 40 is reciprocated from the open position of FIG. 1 to the closed position of FIG. 2, several things occur to establish an effective high pressure seal. A differential pressure is created across the face of seat member 22 due to the high upstream pressure in conduit 12 and the lower pressure in chamber 16. This creates an unbalanced force forcing seat member 22 toward gate 40 since the outer end of seat member 22 and resilient seal 86 are subjected to full upstream pressure. At the fully closed position, annular gate sealing groove 45 is in communication with jumper port 83 allowing sealant material to be squeezed into groove 45 creating an effective seal between the upstream face of gate 40 and the sealing face 84 of seat member 22. This increases the sealing force against seat member 22 since the entire area at the outer end of seat member 22 is subjected to upstream pressure while a considerably reduced area at the face 84 is then subjected to this pressure. Since the gate 40 is subjected, on the upstream side, to a high pressure the gate moves a slight amount laterally forcing skirt 33 and seat member 23 axially downstream until the hub 71 of downstream skirt 33 abuts the wall of valve chamber 16 to function as a stop means. Downstream seal member 23 is free to move further downstream and does not seal against the gate 40 so that the gate rides on the low-friction face 70 of downstream skirt 33.

A unique feature of the sealant system resides in the design of the pistons 93, 94 and port bushings 95, 96. Each piston member has a frusto-conical tip 121, 122 which is designed to cooperatively mate with a frusto-conical entrance to the ports of bushings 95, 96. Thus, when the sealant reservoirs are depleted the tips sealingly engage these ports, to become shut-off valves. This prevents pressure blow-by through ports 97, 98 to gate sealant grooves 45, 47. Pressure blow-by particularly from the high pressure upstream side, would cause damaging erosion to the sealing surfaces of the seat members 22, 23 and gate 40. The applicants' are not aware of a shut-off, such as this, suitable for high pressure valves.

One of the disadvantages of high pressure valves of the prior art is the high torque required to open the valve. The high friction between the seat and gate and the possibility of pressure lock due to the high differential across the gate presents a serious design problem. The present invention eliminates these problems. The gate 40, in the closed position of FIG. 2, rides on the low friction face 70 of skirt 33. There is no seal between the gate 40 and the downstream seat member 23. Therefore, a minimum torque is required to open the valve and reciprocate gate 40 between the fully closed position of FIG. 2 and the fully open position of FIG. 1. The valve may be designed as shown for reverse flow so that the downstream side would become the upstream side and vice versa. It can easily be understood that the outlet side of the valve could be much less complex than shown. However, for reverse flow or for interchangeable connection the embodiment shown would be preferable.

As an alternative construction, gate 40 could also be provided with another set of sealant grooves 145, 147 around gate opening 43, as shown in FIG. 3. This would create a seal between the conduits 12, 13 and valve chamber 16 when the valve is in the opened position shown in FIG. 3. This would prevent line trash from entering chamber 16. It could also be used to isolate the chamber from extreme line pressures or corrosive line products. The seals would function in much the same manner as the closed position upstream seal, explained with reference to FIGS. 1A and 2 heretofore. The resilient seals 86 and 86a would bias their respective seat members 22, 23 toward gate 40. If used to isolate the valve chamber 16 from high line pressures, the chamber could be bled down through a vent (not shown) to atmosphere. The differential pressure between the chamber 16 and conduits 12, 13 would increase the sealing force between seat members 22, 23 and gate 40 and would force sealant material from reservoirs 91, 92 through ports 97, 98, sealant grooves 81, 82, and jumper ports 83, 87 into sealant grooves 145, 147.

Only two preferred embodiments of the invention are shown in the drawings and described in the specification, but many variations thereof will be apparent to those skilled in the art. It is impractical to show or describe all the variations included within the invention, and therefore the embodiments described should be considered illustrative only, and not limiting, the scope of the invention being as broad as is defined by the appended claims. The form of the claims and the specification, including the abstract, is adopted solely for easier reading and understanding and should not be considered in interpreting the scope of the invention as claimed.

We claim:

1. A gate valve comprising: a valve body having opposing inlet and outlet conduits with a chamber therebetween, a plane surfaced seat member mounted for reciprocation in said inlet conduit, said seat member having a passage therethrough coaxial with said inlet conduit, a plane surfaced gate in said chamber having an opening therethrough, means mounting said gate for movement axially relative to said conduits, means for moving said gate transversely to the axes of said conduits between a closed position in which flow is blocked through said conduits and an open position in which flow is allowed through said conduits and said gate opening, means urging said seat member and said gate toward each other, plane surfaced skirt member mounted in said chamber adjacent said gate member with an opening therethrough aligned with said outlet conduit, said skirt member providing a sliding surface for the side of said gate member opposite said inlet conduit, said sliding surface having a lower coefficient of friction than the surface of said seat member that is in contact with said gate, and pressure sealing means between said gate and said seat around said passage through said seat, said gate member in closed position providing pressure isolation of said chamber only from the inlet one of said conduits leaving said chamber in pressure communication with said outlet one of said conduits.

2. A gate valve as set forth in claim 1; characterized in that the skirt member is axially movable in reference to the outlet conduit.

3. A gate valve comprising: a hollow valve body having opposed conduits for the inlet and outlet of fluid, a plane surfaced seat member in at least one of said conduits reciprocably mounted therein and having a flow passage therethrough aligned with said conduits, a plane surfaced gate having an opening therethrough, means mounting said gate member for movement axially of said conduits, means urging the plane surfaces of said gate and seat toward and in contact with each other, and means for moving said gate transversely to the axes of said conduits between a closed position in which said gate blocks flow through said conduits and an open position in which said gate allows flow through said conduits and said gate opening; a skirt member surrounding said seat member and mounted therewith for axial movement relative to each other, said skirt member having a plane surfaced face substantially parallel with the opposing surface of said plane surfaced gate, and means preventing axial movement of said skirt member relative to said seat member in a direction away from said gate beyond a certain position in which said face of the skirt member is coplanar with said plane surface of said seat member, and means limiting axial movement of said skirt member relative to said valve body in a direction away from said gate member without barring movement of said seat member relative to said skirt member away from said gate member when said skirt member is at the limit of its travel away from said gate member relative to said valve body, whereby when said valve is placed in a flow line and disposed so that said seat member is in the outlet conduit and the valve is closed, the force of the line pressure on the gate will be taken primarily by said skirt member and when said valve is disposed so that the seat member is in the inlet conduit the skirt will be urged into contact with the gate along with said seat.

4. A gate valve as set forth in claim 3; characterized in that said skirt member has a bore and a counterbore joined by an annular surface facing said gate, said seat member having annular shoulder means engageable with said annular surface for cooperative axial movement of said seat and skirt member relative to said conduits, thereby providing said means preventing axial movement of the skirt member relative to said seat member beyond said certain position.

5. A gate valve as set forth in claim 3; characterized in that the said face of said skirt member is coated with a material of lower friction coefficient than said plane surface of the seat.

6. A gate valve as set forth in claim 3; characterized in that said skirt member is mounted between said gate and one wall of said valve body for limited movement therebetween, said one wall providing said means limiting axial movement of said skirt member relative to said valve body.

7. A gate valve as set forth in claim 6; characterized in that said skirt member is provided with a hub portion surrounding said bore and counterbore adjacent said valve body wall, said hub member assisting in limiting the axial movement of said skirt member in said one direction relative to said conduits.

8. A gate valve as set forth in claim 3; including a sealant system comprising at least one reservoir mounted in said valve body for containing a plastic sealant material, piston means within said reservoir, port means connecting said reservoir and an annular sealing groove at the interface of said gate and said seat member when said gate is in said closed position, one side of said piston means being subjected to pressure within one of said conduits for squeezing sealant material from said reservoir through said port means and into said sealing groove, characterized in that said piston means is provided with a frusto-conical tip engageable with a corresponding frusto-conical entrance to said port means to shut off flow from said reservoir to said sealing groove on depletion of said reservoir.

9. A gate valve as set forth in claim 3; characterized by a sealant system comprising at least one reservoir mounted in said body for containing a plastic sealant material, piston means within said reservoir, port means connecting said reservoir and an annular sealing groove in said gate at the interface of said gate and said seat member positioned to encompass said flow passage through said seat when said gate is in said open position, said skirt covering said sealing groove when said gate is in said closed position.

10. A gate value comprising: a valve body having inlet and outlet conduits, a plane surfaced seat member in at least one of said conduits, a plane surfaced gate having an opening therethrough, means urging said gate and seat toward and in contact with each other, and reciprocating means for moving said gate between a closed position in which said gate blocks flow through said conduits and an open position in which said gate allows flow through said conduits and said gate allows flow through said conduits and said gate opening; characterized in that said seat member comprises a cylindrical body mounted in one of said conduits for limited, axial movement relative thereto, a first end of said body being an annular plane surface for said contact with said gate, a second end of said body having a total area substantially equal to said annular plane surface at said first end and subjected to the pressure within one of said conduits, characterized in that a plane surfaced skirt member is mounted around one end of said seat member within a chamber of said valve body for limited axial movement relative to said conduits, said skirt movement being limited in one direction by contact with said gate and in the opposite direction by contact with a wall of said chamber, and engagement means to cause said skirt to move with said seat into contact with said gate without preventing said seat from moving away from said gate when motion of said skirt away from said gate is prevented by said contact with a wall of said chamber.

11. A gate valve as set forth in claim 10; characterized in that said skirt member is provided with a bore and counterbore connected by an annular surface facing said gate, said seat member having an annular shoulder surrounding said seat body adapted for engagement with said skirt annular surface for cooperative movement of said skirt and said seat member toward said gate, said surface and shoulder providing said engagement means.

12. A reversible upstream sealing gate valve comprising:
a valve body with conduits at opposite sides of a valve chamber providing for the ingress and egress of fluid,
an annular seat member mounted in each of said conduits for reciprocation axially thereof, each seat member having an outer end exposed to pressure in the conduit in which it is mounted and an inner end providing a seating face, means sealing around each seating member between the seating member and the conduit in which it is mounted,
a gate member having plane surfaces on opposite sides thereof and having an opening therethrough, means supporting said gate member in said valve body with said gate member disposed between said seating faces of said seat members and permitting movement of said gate member axially of said conduits, resilient means urging each of said seat members toward said gate member placing them in contact with each other at said seating faces, reciprocating means for moving said gate transverse to the axis of said conduits between a closed position in which said gate blocks flow through said conduits and an open position in which said gate allows flow through said conduits and said opening, member, each
a skirt member adjacent each of said seat members, each of said skirt members having a plane surface in sliding contact with the adjacent one of said plane surfaces of said gate member, each skirt member being mounted around the inner end of the adjacent seat member for axial movement relative thereto, means preventing axial movement of each skirt member relative to the associated seat member in a direction from the inner toward the outer end of the seat member beyond a position in which said plane surface of the skirt member is coplanar with said seating face of the seat member, each of said skirt members being adapted for axial movement cooperatively with its associated seat member relative to said conduits, each skirt member having the said plane surface thereof pressed axially inwardly against the adjacent plane surface of the gate as said resilient means urges said seat members toward said gate member, each skirt member and associated seat member moving axially outwardly with said gate member when the gate member moves from one of said conduits toward the other under the force of the fluid pressure on the outer end of the upstream one of the seats when the gate is in closed position, and
means to limit said axial outward movement of each of said skirt members relative to the associated conduit when said gate is in said closed position but to allow further axial outward movement of its associated seat member, whereby the pressure between the gate and the seating face of the downstream one of the seat members when the gate is in closed position may be less than that between the gate and the seating face of the upstream one of the seat members to reduce wear on the seating face of the downstream seat member.

13. A gate valve as set forth in claim 12, the said plane surface of each of the skirt members having a lower coefficient of friction than the seating face of the associated seat member.

14. A gate valve as set forth in claim 12; including sealing means additional to said contacting plane and seating surfaces to seal between each seat member and the gate around said opening in the gate when said gate is in closed position.

15. A gate valve as set forth in claim 14; sealing means comprising for each seal member a sealant reservoir and port means connecting said reservoir with an annular sealant groove at the interface of said seat member and said plane surfaced gate, a piston means in said reservoir, one side of which is subjected to pressure within the conduit associated with said seat member to force sealant material into said annular sealant groove when said gate is in closed position but only if said conduit is the inlet conduit to the valve, whereby said valve chamber is pressure isolated from the inlet conduit but is in pressure communication with the other conduit which is the outlet conduit of the valve.

16. A gate valve as set forth in claim 15; characterized in that said piston means and said port means are provided with shut-off means to close said port means on depletion of sealant material in said reservoir to prevent flow through said port means, whereby when the gate is in closed position leakage from the inlet conduit to the outlet conduit through the sealing means of the seat member in the inlet conduit is prevented.

17. A gate valve as set forth in claim 13; characterized in that said sealing means comprises four annular sealant grooves, there being two such grooves on each side of said gate, one of said grooves on each side of the gate begin adjacent the one of said seat members on that side of the gate in said open position and the other being adjacent said one of said seat members in said closed position, and means to force plastic sealant material into said grooves when they are adjacent said seats.

18. An automatic plastic sealing valve comprising: a valve body having inlet and outlet conduits with inlet and outlet seats mounted respectively therein, a plane surfaced gate having an opening therethrough, reciprocating means for moving said gate between a closed position blocking flow through said conduits and an open position allowing flow through said conduit and said gate opening, a sealant groove at the interface of at least one of said seat members and said gate when said gate is in the closed position, and a sealant system for supplying plastic sealant material to said sealant groove, said sealant system comprising a reservoir with piston means mounted therein and port means connecting said reservoir and said sealant groove, said piston means being subjected on one side to pressure from the inlet conduit, characterized in that said sealant system is provided with a shut-off valve automatically operable on the depletion of sealant material in said reservoir to shut-off flow through said port means.

19. An automatic plastic sealing valve as set forth in claim 18; characterized in that said shut-off valve comprises a frusto-conical tip on one side of said piston means and a frusto-conical entrance into said port means engageable with said lip.

20. An automatic plastic sealing valve as set forth in claim 19; characterized by a sealant groove at the interface of said one of said seat members and said gate and connected to said reservoir when said gate is in the open position.

* * * * *

PO-1050
(5/69)

UNITED STATES PATENT OFFICE
CERTIFICATE OF CORRECTION

Patent No. 3,696,831      Dated October 10, 1972

Inventor(s) John H. Fowler and Robert D. Barnett

It is certified that error appears in the above-identified patent and that said Letters Patent are hereby corrected as shown below:

Column 8, line 3: After "opening," delete "member, each".
Column 10, line 16: After "said" delete "lip" and insert
-- tip --.

Signed and sealed this 27th day of March 1973.

(SEAL)
Attest:

EDWARD M. FLETCHER, JR.
Attesting Officer

ROBERT GOTTSCHALK
Commissioner of Patents